Oct. 24, 1939.                M. GOTTLIEB                2,177,063
                                GOVERNOR
           Original Filed April 30, 1937    3 Sheets—Sheet 1

WITNESSES:

INVENTOR
MANIOUS GOTTLIEB.
BY
ATTORNEY

Oct. 24, 1939.  M. GOTTLIEB  2,177,063

GOVERNOR

Original Filed April 30, 1937   3 Sheets-Sheet 2

WITNESSES:

INVENTOR
MANIOUS GOTTLIEB.
BY
ATTORNEY

Oct. 24, 1939.　　　　M. GOTTLIEB　　　　2,177,063
GOVERNOR
Original Filed April 30, 1937　　3 Sheets-Sheet 3

WITNESSES:
N. J. Eisinger
J. N. Mosser

INVENTOR
MANIOUS GOTTLIEB.
BY
A. B. Renoir
ATTORNEY

Patented Oct. 24, 1939

2,177,063

UNITED STATES PATENT OFFICE 2,177,063

GOVERNOR

Manious Gottlieb, Philadelphia, Pa., assignor to Westinghouse Electric & Manufacturing Company, East Pittsburgh, Pa., a corporation of Pennsylvania Application April 30, 1937, Serial No. 140,063
Renewed February 4, 1939

4 Claims. (Cl. 264—15)

My invention relates to a centrifugal fly-ball governor, and it has for an object to provide improved apparatus.

Another object is to provide a governor that effects close speed regulation, and which has greater power for operating an admission valve or other mechanism.

A further object is to provide a governor in which sliding friction is eliminated, whereby greater sensitivity is obtained.

Another object is to provide a governor, the operation of which is not appreciably affected by a small degree of misalignment between the parts of the governor or between the governor and the valve operating lever, such as encountered in ordinary manufacturing process.

In accordance with my invention, I provide a governor in which three or more centrifugal weight members are mounted on a rotating housing or driving member, preferably by ball bearings, and bear axially against a thrust member. The thrust member is biased against the weight members, preferably by a spring acting between the thrust member and the driving member. The thrust member is formed with an annular conical surface, and the weight members are formed with curved surfaces bearing against the conical surface, the curved surfaces being formed so that pure rolling contact takes place between the curved and the conical surfaces. The thrust member is centered solely by the rolling contact. It is connected through a self-aligning bearing to an axially extending member, through which the axial controlling movements of the governor are transmitted. The thrust member is free to tilt in any direction under the influence of the resultant of the spring and the governor weight forces acting thereon.

The above and other objects are effected by my invention as will be apparent from the following description and claims taken in connection with the accompanying drawings, forming a part of this application, in which:

Figure 1:
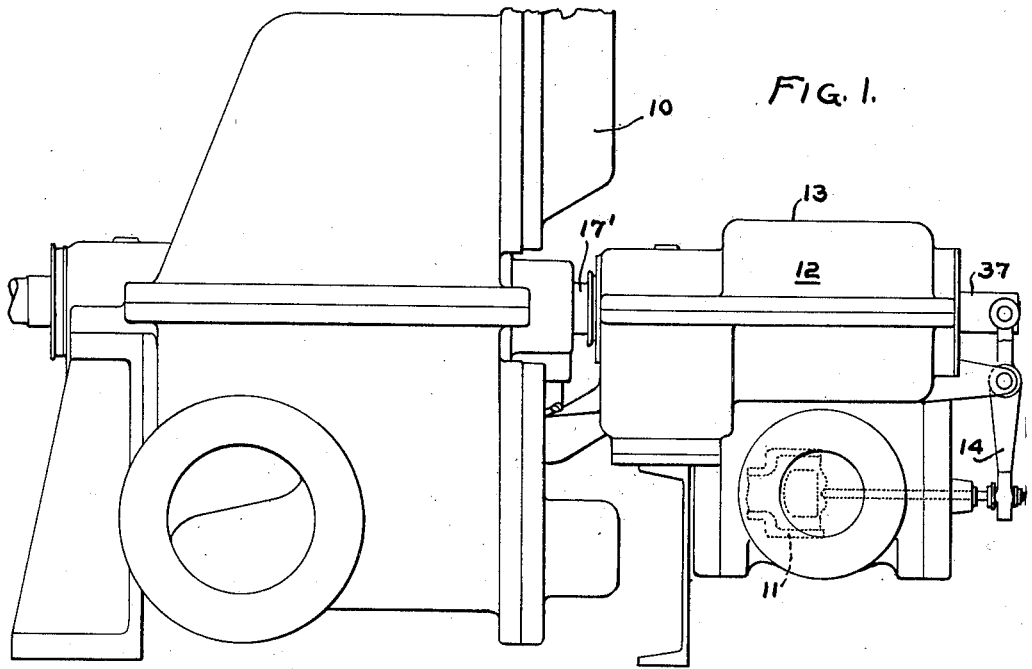
Fig. 1 is a side elevation of a steam turbine embodying my novel form of governor.
Figure 2:
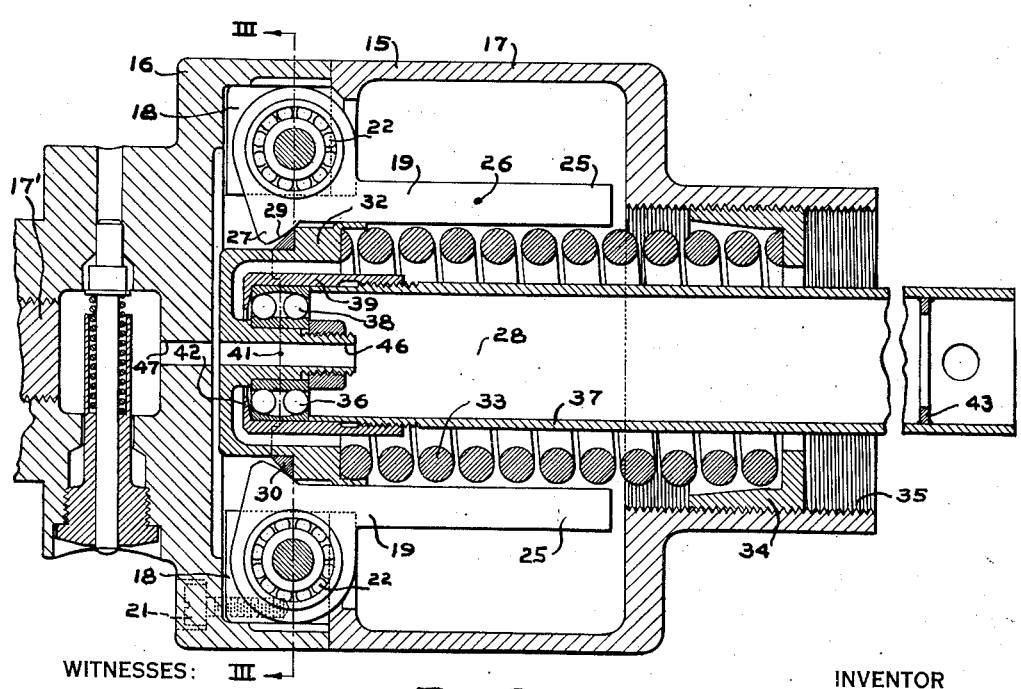
Fig. 2 is a longitudinal sectional view through the governor.

Referring to the drawings in detail, the steam turbine 10 is of any desired type, having an admission valve 11 and a governor 12 which is constructed in accordance with the present invention, enclosed within a governor housing 13 and connected through a lever 14 to the valve 11. The governor, as shown more fully in Fig. 2, comprises a rotating housing 15 which includes a member 16 screw-threaded to the end of the turbine shaft 17' and a second member 17 secured to the member 16. The housing member 17 is formed with projecting lugs 18, shown in Figs. 2 and 3, which serve for mounting the weight members 19 and which project into the housing member 16. Bolts 21 are inserted through the housing member 16 into said projections 18 for securing the housing members 16 and 17 together.

Figure 3:
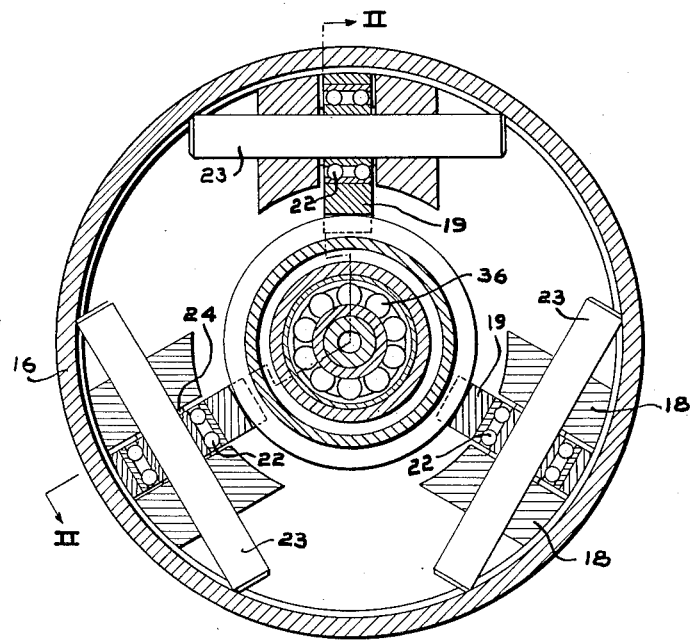
Fig. 3 is a cross section taken on the line III—III of Fig. 2.

As will be noted in Fig. 3, there are three weight members 19 although there may be more if desired. There are two spaced projecting members 18 for each weight member, the latter being mounted therebetween by a ball bearing 22 carried on a pin 23 extending through the two projecting members 18. The pins 23 are retained longitudinally in proper position by engagement with the interior of the housing member 16 as shown in Fig. 3. Washers 24 are provided for spacing the bearing 22 from the projections 18, so that any sudden thrust on the weight member 19, due to sudden change in speed, is taken by the bearing 22, which has two rows of balls. Thus, only rolling friction of the ball bearings is incurred, and sliding friction with the projections 18 is avoided.

Figure 4:
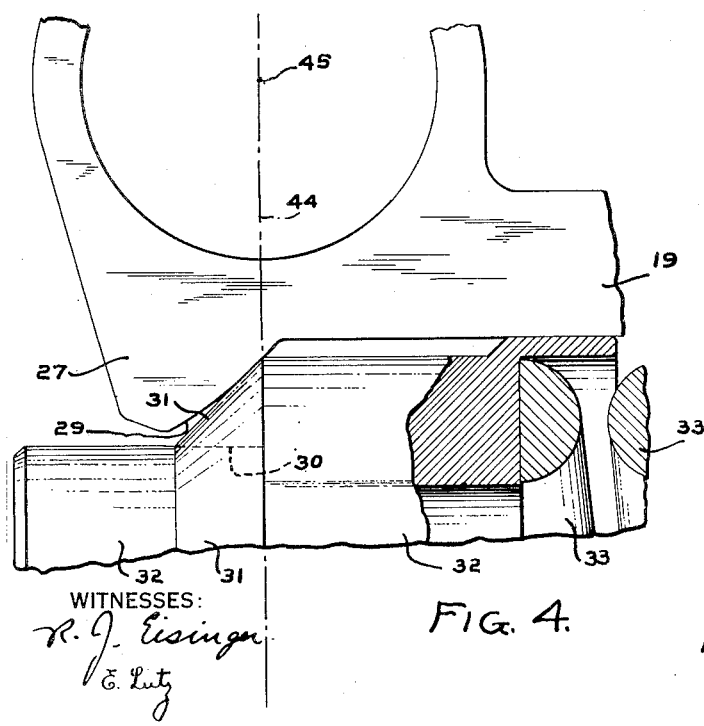
Fig. 4 is an enlarged detail view of one feature of the invention.

The weight members 19 are provided with axially extending weight arms 25, which constitute the centrifugal weights and which are movable in radial direction under varying centrifugal force. The center of gravity of the weight member is located at 26, which is approximately the center of the weight arm 25. Each weight member 19 is formed with a lug or toe 27 projecting radially toward the axis of the turbine shaft, indicated at 28. The lug 27 is formed with a curved surface 29, as shown in Fig. 4, engaging the conical surface 31 of a thrust member 32. The latter may have a separate piece 30 of harder material to provide the conical surface. A spring 33 is provided for opposing the centrifugal force of the weight members, and in the present form comprises a helical spring disposed concentrically of the shaft axis 28. It abuts at one end against the thrust member 32 and at the other end against an abutment member 34 screw-threaded in the housing member 17, as shown at 35. Adjustment of the spring may be effected by turning the member 34.

The thrust member 32 is connected by means of a self-aligning ball thrust bearing 36 to one end of a tubular connecting member 37, which extends axially of the shaft from said thrust member to the lever 14 and is connected to the latter. The ball bearing 36 includes two annular rows of balls 38 and the outer race 39 carried by the tubular member 37 is spherical, so as to permit the thrust member 32 to tilt in any direction about the center 41 of the spherical surface 39. The tubular member 37 is formed with dams 42 and 43 for retaining lubricant for the ball bearing 36.

The thrust member 32 is centered with respect to the axis 28 solely by engagement of its conical surface 31 with the curved surfaces 29 of the weight members. I prefer to form the conical surface 31 at an angle of about 45° to said axis, inasmuch as this figure provides the best compromise between centering the thrust member and providing minimum resultant radial thrust on the weight members which must be taken by the ball bearings 22.

An important feature of the governor is the formation of the surfaces 29 and 31 so as to obtain pure rolling contact therebetween, thereby avoiding sliding friction. I have found that if these surfaces are designed in accordance with an ordinary gear tooth, pure rolling contact is obtained only at the pitch circle. I provide a variable pitch circle such that the contact is always at the pitch circle. The conical surface 31 having been chosen to be at 45° to the axis, the curved surface 29 is determined as follows: The point of contact is always to be in the plane, indicated on the drawings at 44, which passes through the axes 45 of the bearings 22, and which is normal to the axis 28. The surface 29 is formed so that at each point the tangent to the surface is at an angle of 45° to a radial line extending through said point and the axis 45 of the bearings 22. The resultant surface is, theoretically speaking, an involute. By trial, however, I find a true arc that coincides within .0001 inch with the developed curvature. Accordingly, in practice I form the surface 29 along such true arc, since the same can be manufactured much more expediently and as accurately as the theoretical involute could actually be produced. Thus, the distance between any two contact points on the cone is exactly equal to the corresponding developed distance on the curved surface.

It will be noted that as the centrifugal weights 25 move radially outwardly, the point of contact between the surfaces 29 and 31 moves away from the axis 45, so that the lever arm of the weight members acting on the thrust member 32, that is, the distance from the axis 45 to the point of contact, increases. This means that, for a given amount of centrifugal force of the weight members, the force imposed on the thrust member decreases, as will be readily understood. This decrease in the effective force is used for two purposes. First, it compensates for the increase in centrifugal force due to the increase in radius of the center of gravity 26 from the axis of rotation 28. Secondly, it decreases the valve lift adjacent the closed position and increases the valve lift per unit speed change as the valve approaches the fully opened position. This is desirable inasmuch as greater valve travel is required to effect a given change in the rate of admission of motive fluid through the valve 11 as it approaches full open position. With this arrangement, a ported valve to take care of this condition may be eliminated.

The operation of the above described embodiment is as follows. As the speed of the turbine increases, the centrifugal weights 25 move radially outwardly and the lugs 27 move the thrust member 32 to the right against the force of the spring 33. The tubular member 37 is moved to the right through the ball thrust bearing 36, and the thrust lever 14 moves the valve 11 in closing direction to decrease the supply of motive fluid. Upon decrease in speed, the centrifugal weights 25 are caused to move radially inwardly by the force of the spring 33, transmitted through the thrust member 32 and the lugs 27. The spring 33 also moves the valve 11 in opening direction.

It will be noted that the thrust member 32 does not having a sliding fit to center it, as in previous constructions, but is centered solely by the rolling contact of its conical surface 31 with the curved surfaces 29 of the weight members. It will also be noted that the weight member 32 is thus free to tilt in any direction about the center 41. For example, should the mass of the weight 25 that is in the uppermost position on the drawings be slightly greater than the mass of the other weights, the upper portion of the thrust member 32 would tilt slightly to the right. As the thrust member thus tilts, the lever arm of the upper weight member 19 increases, so that the force effective to tilt the member 32 decreases as the weight 25 moves radially outwardly. Similarly, should the spring 33 exert a greater force at one point of the circumference of the thrust member 32, a condition frequently encountered with springs, the thrust member is free to tilt against the adjacent weight member. In this case, the centrifugal weight 25 is drawn radially inwardly, decreasing the lever arm of the weight member acting against the thrust member. Accordingly, the centrifugal force of the weight member becomes more effective to oppose the increased force of the spring at this point.

It will thus be seen that I have provided a centrifugal fly ball governor wherein sliding friction is eliminated, thereby increasing the sensitivity of the governor and also eliminating the possibility of binding, leaving only rolling friction, which is desirable to damp the movements of the governor.

I have found that a governor constructed as shown and described effects accurate speed control and also provides ample power for moving the valve 11 when applied to a turbine of about 500 kw., since a greater degree of power is available for actuating the steam admission valve than in prior constructions. I have also found that the hysteresis effect has been eliminated, that is, the governor will assume the same position for a given speed when moving in either direction.

In order to guard against an excessive degree of misalignment of the thrust member 32, I form a cylindrical bore 46 extending axially in alignment with a bore 47 in the housing member 16. A rod of slightly smaller diameter than said bore may be inserted into the bore 46, and if it can be inserted into the bore 47, the thrust member is within the necessary degree of alignment. If the rod cannot be inserted into the bore 47, an excessive degree of misalignment is indicated.

Figure 5

Figure 5:
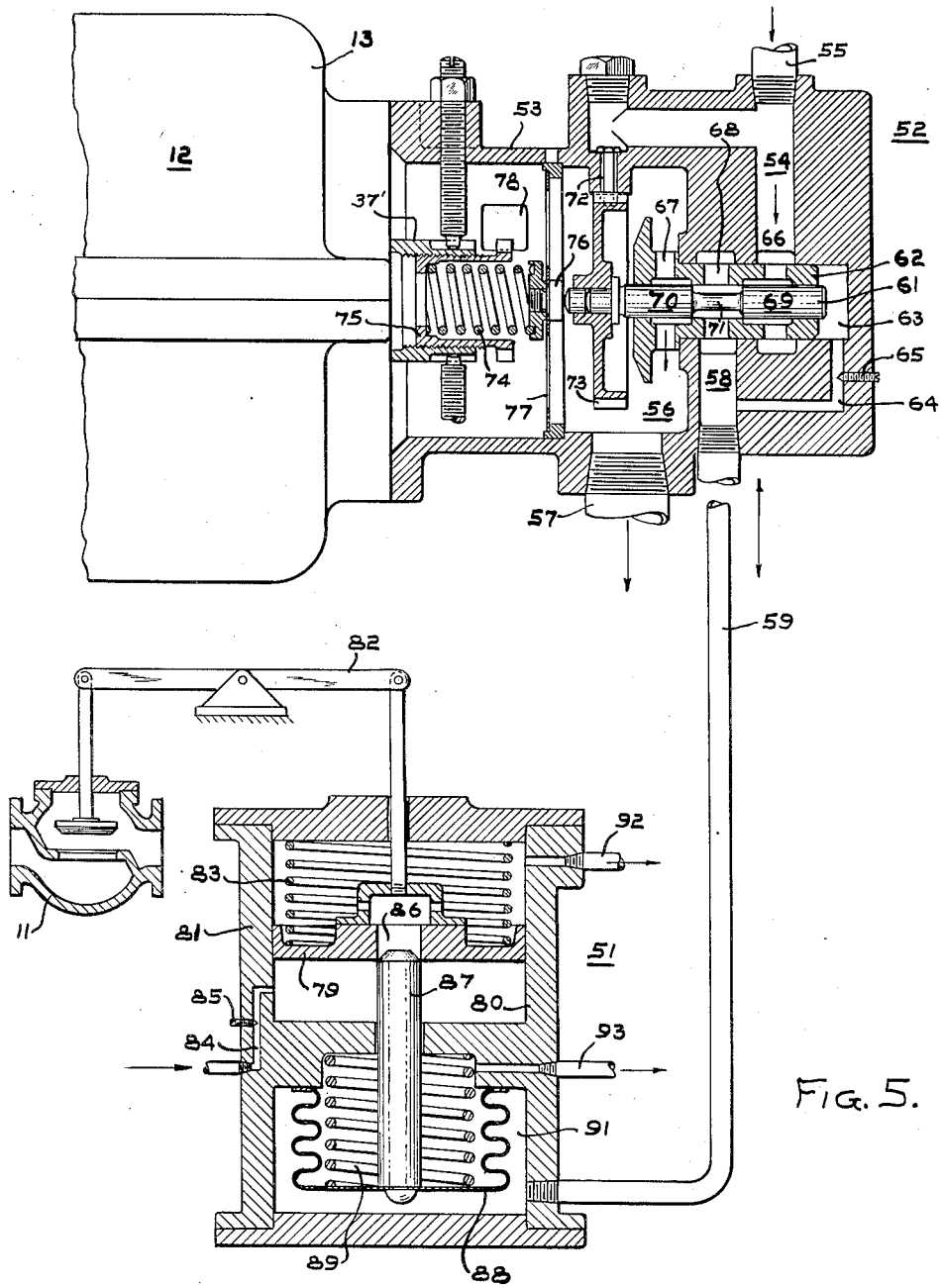
Fig. 5 is a sectional view showing a device, controlled by my novel form of governor, for providing a variable fluid pressure, and a valve operating mechanism controlled thereby.

The governor 12 may be used to control any suitable form of power actuating mechanism for the admission valve, instead of directly operating the valve itself. One embodiment of such an arrangement is shown in Fig. 5, in which the governor 12 controls a power actuating device 51 through the intermediary of a pressure device 52 which provides a variable fluid pressure for controlling the device 51.

The pressure device 52 includes a housing 53 bolted to the end of the governor housing 13. It has formed therein a passage 54, connected through a conduit 55 to any suitable source of fluid under pressure, and a chamber 56 connected to a drain conduit 57. It also has formed therein a passage 58, connected by a conduit 59 to the power actuating device 51, for transmitting to the device 51 the variable fluid pressure for controlling the same. A pilot valve 61 is slidable in a bushing 62 secured in the housing 53. The right-hand end of the pilot valve projects into a chamber 63, and is biased to the left by the fluid pressure therein. A passage 64 provides communication between the passage 58 and the chamber 63, a needle valve 65 being provided to restrict flow of fluid through the passage 64.

The bushing 62 is formed with fluid pressure supply ports 66 communicating with the supply passage 54, drain ports 67 communicating with the chamber 56 and ports 68 communicating with the passage 58. The pilot valve 61 has piston portions 69 and 70 cooperating with the ports 66 and 67, respectively, and a portion of reduced diameter 71, cooperating with the ports 68.

Suitable provision may be made for spinning the pilot valve 61 to avoid static friction. To this end, a passage 72, provided with fluid pressure from the supply passage 54, directs a jet of fluid on a turbine wheel 73 fixed on the pilot valve for causing rotation thereof.

The pilot valve 61 is biased to the right by a spring 74 interposed between the tubular member 37' of the governor and the pilot valve. The left-hand end of the spring bears against a spring holding member 75, screw-threaded into the end of the tubular member 37', and the right-hand end of the spring bears against a spring retainer 76 held by a diaphragm 77 and bearing against the left-hand end of the pilot valve. An opening 78 may be provided in the housing 53 to provide access for adjusting the spring retaining member 75 with respect to the tubular member 37'.

The power actuating device 51 includes a piston 79 operating in a cylinder 80 formed in a housing 81 and connected to the admission valve 11 through a lever 82. The piston 79 is biased downwardly, in valve opening direction, by a spring 83, and is moved upwardly by fluid pressure in the lower end of the cylinder 80. Fluid under pressure is supplied to the lower end of the cylinder 80 through a restricted passage 84 having a needle valve 85 for varying the restriction. The fluid pressure in the cylinder 80 below the piston 83 is controlled by controlling the escape of fluid therefrom. This is done by a port 86 in the piston controlled by a valve member 87.

The valve member 87 is connected to a bellows 88, which is biased downwardly by a spring 89 and upwardly by the variable fluid pressure in a chamber 91, transmitted through the conduit 59. Suitable drain outlets 92 and 93 are provided.

The fluid pressure provided by the device 52 is conveyed through a conduit 92 to a chamber 93 and imposed on a bellows 94 to which the valve member 91 is attached.

Figure 5—Operation

The pressure device 52 provides a fluid pressure controlled by the governor 12 and increasing upon increase in speed and decreasing upon decrease in speed. In the neutral or cut-off position of the pilot valve 61, as shown on the drawings, the force of the spring 74 biasing the pilot valve to the right is balanced by the fluid pressure in the chamber 63 biasing the pilot valve to the left. In this position of the pilot valve, the ports 66 and 67 are closed by the piston portions 69 and 70.

As the speed of the turbine increases, the tubular member 37' of the governor moves to the right and increases the compression of the spring 74. The latter moves to the right, placing the ports 68 in communication with the pressure supply ports 66, thereby causing fluid under pressure to flow into the passage 58 to increase the pressure therein. The increase in fluid pressure is communicated through the restricted passage 64 to the chamber 63, in which it is imposed on the end of the pilot valve 61 to bias the same to the left in opposition to the spring force. As soon as the pressure is increased an amount corresponding to the increase in spring force, the pilot valve 61 is returned to neutral or cut-off position, thereby terminating any further increase in pressure.

Upon decrease in speed, the tubular member 37' moves to the left, so that the force exerted by the spring 74 is decreased and the pilot valve 61 moves to the left under the force of the fluid pressure in the chamber. Fluid pressure from the passage 58 escapes to the drain ports 67, so that the pressure in the passage 58 decreases. When the fluid pressure has decreased to an amount corresponding to the decrease in speed, the reduced fluid pressure in the chamber balances the reduced force of the spring 74 and the pilot valve 61 is returned to cut-off position.

The power actuating device 51 moves the admission valve 11 to a position corresponding to the value of the fluid pressure transmitted to it by the pressure device 52 through the conduit 59. Upon increase in pressure imposed on the bellows 88, the valve member 87 moves upwardly into the port 86 to cut off the escape of fluid therethrough. The fluid pressure beneath the piston thereupon increases due to the continued supply of fluid under pressure through the restricted passage 84. The increased fluid pressure moves the piston 79 upwardly until the port 86 is again opened to such an extent as to permit the escape of the same quantity of fluid that is admitted through the restricted passage 84. The valve 11 is thereby moved in closing direction.

Upon decrease in fluid pressure in the chamber 91, the valve member 87 moves downwardly under force of the spring 89, thereby increasing the escape of fluid through the port 86 and permitting the spring 83 to move the piston downwardly until the opening of the port 86 is again reduced to such an extent as to exhaust a quantity of fluid equal to the admission. The admission valve 11 is thereby moved in opening direction.

It will thus be seen that the admission valve 11 is moved in closing direction upon increase in fluid pressure provided by the pressure device 52 upon increase in speed, and that it is moved in opening direction upon decrease in fluid pressure provided upon decrease in speed.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In a governor, a rotating driving casing, a plurality of weights extending lengthwise of the interior of the casing, pivots for like ends of the weights and carried interiorly by the casing, the axes of the pivots being in a plane normal to the axis of rotation of the casing, each weight having a tooth which extends inwardly from its pivot, a thrust member having an annular surface engaging adjacent faces of said teeth, said faces of the teeth and said annular surface being arranged for rolling contact with radial movement of the weights and being so disposed that the points of rolling contact for all positions of the weights fall in said normal plane containing the pivot axes, a spring carried by said casing and exerting its force on the thrust member in opposition to the centrifugal effect of said weights thereon, said thrust member being free of said casing and positioned entirely by the spring and points of tooth engagement, a link for transmitting movement due to axial displacement of said thrust member, and a universal connection between the link and the thrust member.

2. In a governor, a rotating driving casing, three weights extending lengthwise of the interior of the casing and spaced circumferentially of the latter, pivots for like ends of the weights and carried interiorly of the casing, the axes of the pivots being in a plane normal to the axis of rotation of the casing, each weight having a tooth which extends inwardly from its pivot, a thrust member having an annular surface engaging adjacent faces of said teeth, said faces of the teeth and said annular surface being arranged for rolling contact with radial movement of the weights and being so disposed that the points of rolling contact for all positions of the weights fall in said normal plane containing the pivot axes, a spring carried by said casing and exerting its force on the thrust member in opposition to the centrifugal effect of said weights thereon, said thrust member being free of said casing and positioned entirely by the spring and points of tooth engagement, a link for transmitting movement due to axial displacement of said thrust member, and a universal connection between the link and the thrust member and having its center, when the weights are in their mean position, arranged approximately in said normal plane of the pivot axes.

3. In a governor, a rotating driving casing, weights extending lengthwise of the interior of the casing, pivots for like ends of the weights and carried by the interior of the casing, said pivots having their axes arranged in a plane which is normal to the axis of rotation of the casing, each weight having an inwardly extending tooth, a thrust member having an annular surface engaging adjacent faces of said teeth, said annular surface being comprised by an element of a right cone and each tooth face being curved to have rolling contact therewith and the annular surface and the tooth faces being so disposed that the points of rolling contact fall in said normal plane of the pivot axes, a spring carried by said casing and exerting its force on the thrust member in opposition to the centrifugal effect of said weights, said thrust member being free of said casing and positioned entirely by the spring and points of tooth engagement, a link for transmitting movement due to the axial displacement of said thrust member, and a universal connection between the link and the thrust member comprised by a ball bearing permitting relative rotation of said thrust member in said link.

4. In a governor, a rotating driving casing, weights extending lengthwise of the interior of the casing, pivots for like ends of the weights and carried by the interior of the casing, said pivots having their axes arranged in a plane which is normal to the axis of rotation of the casing, each weight having an inwardly extending tooth, a thrust member having an annular surface engaging adjacent faces of said teeth, said annular surface being comprised by an element of a right cone defining an angle of approximately 45 degrees with respect to the axis of the casing and said tooth faces being curved so as to have rolling contact therewith and the annular conical surface and the tooth faces being so disposed that the points of rolling contact lie in said normal plane of the pivot axes for all positions of the weights, a spring carried by said casing and exerting its force on the thrust member in opposition to the centrifugal effect of said weights, said thrust member being free of said casing and positioned entirely by the spring and points of tooth engagement, a link for transmitting movement due to the axial displacement of said thrust member, and a ball bearing universal connection between the link and the thrust member.

MANIOUS GOTTLIEB.